United States Patent
Koster

(10) Patent No.: US 9,077,828 B1
(45) Date of Patent: Jul. 7, 2015

(54) USING TWO-DIMENSIONAL BARCODES WITH GENERAL PURPOSE RELOADABLE CARDS TO FACILITATE ACCESS TO A CONTACT CENTER

(75) Inventor: Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 437 days.

(21) Appl. No.: 13/525,994

(22) Filed: Jun. 18, 2012

(51) Int. Cl.
*H04N 1/00* (2006.01)

(52) U.S. Cl.
CPC ....... *H04N 1/00334* (2013.01); *H04N 1/00326* (2013.01)

(58) Field of Classification Search
CPC ............ G06Q 20/367; G06Q 20/3676; G06Q 20/3276; G07F 7/1008
USPC ........................ 235/380; 705/14.27, 14.33, 41
See application file for complete search history.

(56) References Cited

U.S. PATENT DOCUMENTS

| | | | | |
|---|---|---|---|---|
| 7,156,311 B2 * | 1/2007 | Attia et al. | | 235/462.46 |
| 7,387,250 B2 * | 6/2008 | Muni | | 235/462.01 |
| 2007/0022019 A1 * | 1/2007 | Sherwin et al. | | 705/26 |
| 2007/0194104 A1 * | 8/2007 | Fukuda et al. | | 235/379 |
| 2008/0052164 A1 * | 2/2008 | Abifaker | | 705/14 |
| 2009/0099965 A1 * | 4/2009 | Grant, IV | | 705/41 |
| 2010/0125495 A1 * | 5/2010 | Smith et al. | | 705/14.23 |
| 2011/0307318 A1 * | 12/2011 | LaPorte et al. | | 705/14.33 |
| 2012/0209688 A1 * | 8/2012 | Lamothe et al. | | 705/14.27 |

OTHER PUBLICATIONS

9 QR Code Data Types, http://notixtech.com/blog/9_qr_code_data_types, Mar. 3, 2011.

\* cited by examiner

*Primary Examiner* — Christopher Stanford

(57) ABSTRACT

In various embodiments, two-dimensional ("2D") barcodes are used in conjunction with a general purpose reloadable debit card ("GPR card") to facilitate various user administration and management actions. The 2D barcode allows a user to easily perform various actions without having to enter account information. The actions may be initiated upon reading the 2D barcode, and may include accessing a web site, initiating a voice call, sending a text message, or sending an email message. The communications may include indication of the account number, so that a contact center, upon receiving the communication, can quickly ascertain the balance. In addition, a destination address encoded in the 2D barcode may be used to uniquely identify the brand of GPR card and/or type of card within a brand. An originating address associated with the communication may be verified against address information associated with the account number.

14 Claims, 14 Drawing Sheets

USING TWO-DIMENSIONAL BARCODES WITH GENERAL PURPOSE RELOADABLE CARDS TO FACILITATE ACCESS TO A CONTACT CENTER

CROSS REFERENCE TO RELATED APPLICATIONS

This application is related to U.S. patent application Ser. No. 13/461,513, filed on May 1, 2012, entitled Managing Electronic Consent for Calling Campaigns, now U.S. Pat. No. 8,548,133; U.S. patent application Ser. No. 13/461,541, filed on May 1, 2012, entitled Using Quick Response Codes to Generate An Electronic Consent Database; and U.S. patent application Ser. No. 13/461,515, filed on May 1, 2012, entitled, Integrating Two-Dimensional Barcodes and Embedded links with Call Center Operation, now U.S. Pat. No. 8,526,922, the contents of all of which are incorporated by reference for all that they teach.

BACKGROUND

Prepaid debit cards, also referred to as general purpose reloadable ("GPR") cards, are increasing in popularity. GPR cards allow individuals without a bank account, or with poor credit, to obtain some of the benefits and convenience of using a debit or credit card, which they otherwise may be unable to obtain. GPR cards allow disbursements, such as government benefits, tax refunds, or payroll disbursements, to be deposited in an account associated with the GPR card. GPR cards can be "reloaded" or replenished by payment of cash or check to increase the balance amount. Unlike pre-paid debit cards that are associated with an individual's checking or savings account, GBR cards are typically "stand-alone" and are not linked with the user's other accounts, nor is there a requirement that the user even have other accounts.

A GPR card may be obtained from various sources, such as from a financial institution, retailer, or on-line. Typically, information such as the name and social security number of the individual may be required to obtain a GPR card. In many embodiments, the card itself has the user's name indicated on the card, which may be embossed. Hence, in many instances the card is mailed to the user. Then, the user loads an amount of money on the card, which may be accomplished by the individual providing cash or other forms of payment to the card provider. The payment can be provided when initially obtaining the card, or afterwards prior to activating the card. Once the card is "loaded" and activated, it can be used for purchase transactions. After time, additional amounts can be added, which is called "reloading" the card. GPR cards are unlike gift debit cards, which are generally not reloadable.

Various fees are typically associated with GPR cards. Fees may be levied for initially obtaining the card, when checking the balance when using an ATM machine, withdrawing cash from an ATM machine, making a purchase, not using the card, or by carrying less than a minimum balance from month to month.

While the card user may recall the amount initially loaded on the GPR card, or the last "reload" amount, it is quite easy for the card user to not know the current balance or the exact amounts of recent transactions. Knowing the current balance is critical to the user since purchases are limited to the amount in the account, and checking the balance by using an ATM machine may incur additional fees. Further, an ATM machine may not be readily available when the user needs to ascertain the balance (which may be just prior to a purchase). Further, accessing an ATM machine may be risky, since many robberies are known to occur at ATM locations. It is with respect to these and other considerations that the disclosure herein is presented.

BRIEF SUMMARY

Technologies are generally presented herein pertaining to using 2D barcodes on GPR cards for accessing a contact center. A 2D barcode may be printed on the GPR card to facilitate the user performing various card management actions, such as reviewing terms and conditions associated with GPR card usage or checking the current balance on the GPR card. Access to this information may be facilitated by using a smart phone to "read" the 2D barcode on the GPR card to access a contact center, which can provide various information associated with the card and/or account, and/or allow the user to perform various management functions.

Reading the 2D barcode can, in one embodiment, transmit a request to a contact center for a current balance, and receive a response indicating the balance. This request may be in the form of a text message, which allows the receiving system to match whether the originating telephone number is associated with the GPR card account. This communication approach may be used to provide a quick, easy, and convenient form of access for the user to be informed of the current balance, recent purchases, or fees.

The subject matter disclosed herein may be implemented as a computer-controlled apparatus, a method, a computing system, or as an article of manufacture such as a computer readable storage medium. These and various other features will be apparent from the following description and associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
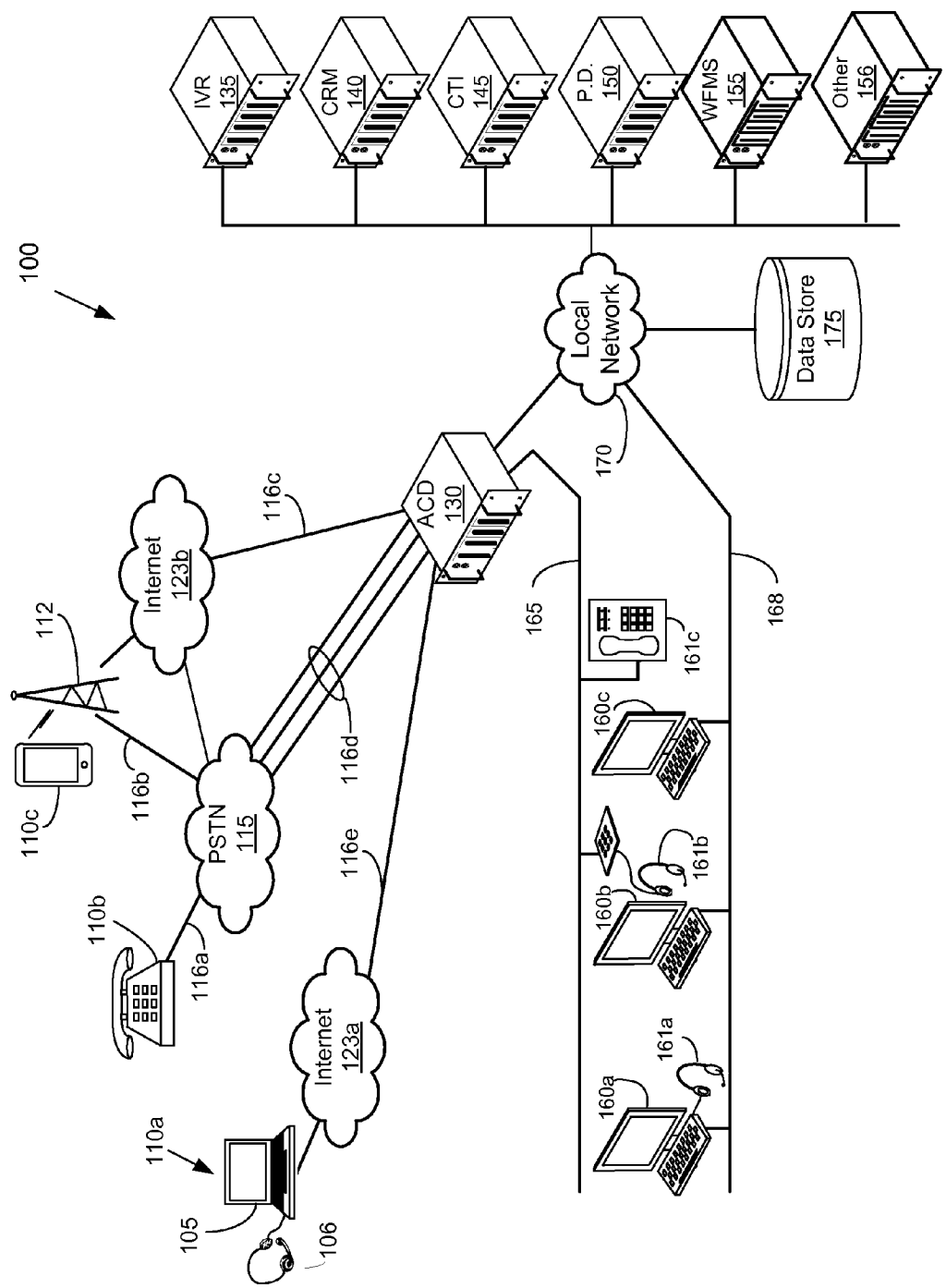
FIG. 1 shows one embodiment of a call center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Call Center Architecture

FIG. 1 shows one embodiment of a call center architecture 100 illustrating the various technologies disclosed herein. The call center shown in FIG. 1 may process voice calls that are inbound-only, outbound-only, or a combination of both (sometimes referred to as a "blended" call center). Although many aspects of call center operation are disclosed in the context of voice calls, in various embodiments, the call center may process other forms of communication such as, for example, facsimiles, emails, text messages, video calls, and chat messages. Since the call center may handle calls originating from a calling party, or initiated to a called party, the term "party," without any further qualification, refers to a person associated with a call processed by the call center, where the call is either received from or placed to the party. The term "caller," if used, will generally refer to a party communicating with the call center, but in many cases this usage is exemplary. Thus, use of the term "caller" is not intended to limit the concepts to only inbound calls or voice calls, unless the context dictates such. Specifically, a "caller" may originate calls that are voice calls or text calls.

Depending on the embodiment, inbound voice calls may originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a smart phone device 110c, such as a smart phone, tablet, or other smart device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123b using Internet-based protocols. For convenience, unless indicated otherwise, the term "trunk" refers to any type of facility 116c, 116d, or 116e providing voice calls to, or from, the call center, regardless of the type of protocol or technology used. Specifically, a "trunk" is not limited to time-division multiplexing ("TDM") technology.

Inbound voice calls may also originate from a calling party employing a so-called "IP phone," "VoIP phone," or "soft phone" 110a. In one embodiment, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP"). The call may be conveyed by other types of Internet providers 123a, such as a cable company providing Internet access services over a coaxial cable facility 116e. Those skilled in the art will recognize that a variety of protocols and facilities may be used to convey voice calls.

The term "telephone call" as used herein is generally synonymous with a "voice call" unless indicated otherwise. Further, the term "telephone call" may encompass a voice call originating from any type of device, such as a soft phone 110a, conventional telephone, 110b, a smart phone 110c, or other device known in the art. The term "call" as used herein may mean an active instance of two-way communication, an attempt to establish two-way communication, or a portion of the two-way communication. For example, a user at a conventional telephone 110b can dial a telephone call in an attempt to establish two-way communication, and a call can be said to exist even prior to establishment of a two-way connection. In another example, a call may be put on hold, and a portion of the call may be referred to as a "call leg" existing between the caller and certain equipment. A call may comprise a number of concatenated call legs, as known to those skilled in the art. In certain contexts, which will be made explicit, the call may encompass communications other than voice, for example, text, video chat, etc.

In various embodiments, inbound calls from callers to the call center may be received at an automatic call distributor ("ACD") 130. In particular embodiments, the ACD 130 may be a specialized switch for receiving and routing inbound calls under various conditions. Further, the ACD 130 may be embodied as a dedicated form of equipment readily available from various manufacturers, or the ACD 130 may be a so-called "soft switch" comprising a suitable programming module executed by a processing device to perform the necessary functions. The ACD 130 may route an incoming call over call center facilities 165 to an available agent. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the ACD 130.

In various embodiments, calls may be routed over facilities 165 to an agent for servicing. That is, for example, the party may speak with an agent to receive customer service. The physical area at which the agent sits is often referred to as an agent "position" and these positions are often grouped into clusters managed by a supervisor, who may monitor calls and the agents' productivity. An agent typically uses a computing device 160*a*-160*b*, such as a computer, and a voice device 161*a*-161*c*. The combination of computing device 160*a*-160*c* and voice device 161*a*-161*c* may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161*a*-161*c* at the agent's position. Similarly, "routing the call to the agent" means routing a call to the appropriate equipment at an agent's position.

In particular embodiments, the voice device 161*a*-161*c* used by an agent may be a soft phone device exemplified by a headset 161*a* connected to the computer 160*a*. The soft phone device may be a virtual telephone implemented in part by an application program executing on the computer 160*a*. Further, the phone may also comprise an Internet Protocol ("IP") based headset 161*b* or a conventional phone 161*c*. Use of the term "phone" is intended to encompass all these types of voice devices used by an agent, unless indicated otherwise.

Agents typically log onto their workstations prior to handling calls. This allows the call center to know which agents are available for handling calls. In particular embodiments, the ACD 130 may also maintain data of an agent's skill level that may be used to route a specific call to the agent or group of agents having the same skill level. In particular instances, if a suitable agent is not available to handle a call, the ACD 130 may queue the call for the next available agent. As can be expected, various algorithms may be employed to process calls in an efficient manner.

In various embodiments, two types of signaling information may be provided with an inbound call that may be used by the ACD 130 in processing the call. The first type of signaling information indicates the telephone number dialed by the caller, and is frequently referred to as "DNIS," derived from the Dialed Number Identification Service associated with this capability. For example, in particular instances, a call center may provide various services, such as sales, customer service, technical support, etc., each of which may be associated with a different telephone number (e.g., multiple toll free "800" numbers). In these instances, the ACD 130 may use the DNIS to determine the purpose of the call, and potentially identify a group of agents having the appropriate skill level to handle the call. Thus, in various embodiments, the ACD 130 may prioritize and route calls to an agent based on the required skill level. Skills-based routing may be a rule-based set of instructions that the ACD 130 uses to handle calls. Depending on the embodiment, skills-based routing may be implemented by the ACD 130, or by the ACD 130 interacting with a computer-telephone integrated ("CTI") server 145.

In various embodiments, the CTI server 145 may be incorporated in the call center architecture 100 to control and/or coordinate other components of the architecture 100. Specifically, the CTI server 145 may interact with the ACD 130 to coordinate call processing. Thus, in particular embodiments, the CTI server 145 may control routing of calls from the ACD 130 to the various agent workstations and/or may provide data to other components processing the calls. The CTI server 145 may also provide call reporting functionality based on data collected during calls.

The second type of signaling information that may be provided with an inbound call is the calling telephone number, often referred to as automatic number identification or "ANI." In particular embodiments, the ACD 130 and/or CTI server 145 may use the ANI of an incoming call to retrieve caller information from a data store 175 and provide the data to an agent's workstation computer 160*a*-160*c* over facilities 168 along with routing the call to the agent's workstation phone 161*a*-161*c*. Further, in particular embodiments, the ANI may also be used to ascertain a party's status (e.g., a "Gold Level" customer warranting premium service) and/or to facilitate the ACD 130 routing the call to a select group of agents. Depending on the embodiment, the data store 175 may include one or more databases storing different information such as, for example, records of caller information. Further, the data store 175 may be integrated with the CTI server 145, the ACD 130, or segregated as a standalone medium or media.

In various embodiments, the ACD 130 may place a call in a queue if there are no suitable agents available, and/or it may route the call to an interactive voice response server ("IVR") 135 to play voice prompts. In particular embodiments, these prompts may be in a menu type structure and the IVR 135 may collect and analyze responses from the party in the form of dual-tone multiple frequency ("DMTF") tones and/or speech. In addition, the IVR 135 may be used to further identify the purpose of the call, such as, for example, prompting the party to enter account information or otherwise obtain information used to service the call. Further, in particular embodiments, the IVR 135 may interact with other components, such as the CTI server 145 or the data store 175, to retrieve or provide information for processing the call. In other configurations, the IVR 135 may be used to only provide announcements.

Depending on the embodiment, the interaction between the ACD 130, IVR 135, CTI server 145, agent computers 160*a*-160*c*, as well as other components, may involve using a local area network ("LAN") 170. However, other configurations are possible, such as, but not limited to, using a wide area network, wireless network, router, bridge, direct point-to-point links, etc.

In particular embodiments, when an agent is interacting with a called or calling party, the agent may use his workstation computer 160*b* to further interact with other enterprise computing systems, such as, for example, a customer relationship management ("CRM") server 140. A CRM server 140 may be used to integrate information from various enterprise business systems to facilitate the agent servicing the call. In addition, the CRM server 140 may provide a variety of applications.

In addition to receiving inbound communications, including, for example, voice calls, emails, text messages, and facsimiles, the call center may also originate communications to a called party, referred to herein as "outbound" communications. In some embodiments, a call center may employ a dialer 150, such as a predictive dialer, to originate outbound calls on behalf of an agent at a rate designed to meet various criteria. Similar to the other components within the call center architecture 100, depending on the embodiment, the dialer 150 may comprise one or more software modules executing on a processing device hardware platform.

In various embodiments, the dialer 150 is typically configured to dial a list of telephone numbers to initiate outbound calls, which can be accomplished by instructing the ACD 130 to originate the calls. Thus, in some embodiments, the ACD 130 may include functionality for originating calls, and if so, this functionality may be referred to as a private automatic branch exchange ("PBX" or "PABX"). In other embodiments (not shown), the dialer 150 may directly interface with voice trunks using facilities 116*c*, 116*d*, 116*e* to the PSTN 115 and/or Internet providers 123*b* for originating calls. After the calls are originated, a transfer operation by the ACD 130 may connect the call with an agent, or place the call in a queue for an available agent. In the latter case, announcements or music may be provided to the party. In various embodiments, the dialer 150 may make use of one or more algorithms to determine how and when to dial a list of numbers so as to minimize the likelihood of a called party being placed in a queue while maintaining target agent utilization.

Another server that may be employed in the call center architecture 100 is a workforce management ("WFM") server 155. In various embodiments, this server 155 maintains information to generate agents' schedules to effectively handle inbound/outbound calls. For instance, in particular embodiments, the WFM server 155 may maintain historical call volume information for call campaigns and may forecast expected call volume to predict the number of agents needed to handle the call volume at a defined service level. The WFM server 155 may then apply information about available agents to generate a work roster of agents. In other words, the WFM server 155 may schedule agents for their work shifts according to the anticipated needs of the call campaigns.

Finally, in various embodiments, the call center architecture 100 may include one or more other processing device 156 to perform various functions. For example, in one particular embodiment, the call center architecture 100 includes a processing device 156 to serve as a quality assurance system that records communications fielded by agents and/or allows managers to monitor communications to ensure these communications are being handled correctly.

Although the above components are referred to as a "server," each may be also referred to in the art as a "computing device," "unit" or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the ACD 130, IVR 135, CRM server 140, CTI server 145, dialer 150 and/or WFM server 155 may be combined into a single hardware platform executing one or more software modules. In addition, the call center architecture 100 may be provided as a hosted solution, where the call processing functionality is provided as a communication service (a so-called "communication-as-a-service" or "CaaS") to a call center operator. Thus, there is no requirement that the servers identified above actually be located or controlled by a call center operator.

In addition, depending on the embodiment, the agent positions may be co-located in a single physical call center or multiple physical call centers. The agents may be remotely located from the other components of the call center, and may also be remotely located from each other, sometimes referred to as a "virtual call center." In particular instances, a virtual call center may describe a scenario in which agents work at home, using their own computers and telephones as workstations. In some configurations, a single physical location of the call center may not be readily identifiable. For instance, this may occur when the call processing functions are provided as a service in a hosted cloud computing environment and the agents positions are in their individual residences.

In some contexts, a "contact center" is understood to be a center that receives various forms of communication, including email communications. Hence, the center to which the user communicates with is referred to herein as a "contact center" as opposed to a "call center." The contact center is not limited to processing only conventional voice calls.

Quick Response Codes and Links

Quick response ("QR") codes are one format for two-dimensional ("2D") barcodes that can be used for encoding information. Typically, a camera-equipped mobile device, such as a smart phone, "reads" or scans the QR barcode using the smart phone's digital camera. The smart phone executes a mobile application that controls the processing of the barcode. A number of barcode reader mobile applications can be downloaded for different smart phones, including but not limited to the Apple iPhone® and Android® based smart phones. While there are various standard or proprietary forms of two-dimensional barcodes, the QR code is used to illustrate the concepts herein since this is a common format for which mobile applications can be readily obtained for smart phones. However, depending on the embodiment, other 2D barcodes formats can be used with the technologies disclosed herein. A number of web sites or service providers provide 2D barcode generators that can receive information to be encoded and generate the 2D barcode.

QR codes can indicate an action to be performed by the mobile device after scanning the barcode, and indicate data to be used in performing that action. Typically, the action and data are encoded by the spacing of the black and white squares in a unique pattern using defined encoding rules. As a result, different formats of QR codes can be used to encode various amounts of information, with different capabilities. The actions that may be invoked by the QR code include, for example: providing contact information, defining a calendar event, indicating an email address, indicating a telephone number to dial, providing geo-location information to an application, sending a SMS message, displaying text, logging onto to a Wi-Fi network, and invoking an application, such as Skype® that can initiate a VoIP call.

In particular embodiments, the mobile application may be designed so that user input is required before completing the action that operates using the data. For example, the QR code can load data for initiating a telephone call or a SMS message. In some embodiments, the mobile application can prompt the user to confirm the communication before initiating the communication. Depending on the embodiment, such a configuration may be preferred as opposed to automatically originating the phone call or sending the SMS message without user confirmation.

Further, in particular embodiments, when a QR code is read for sending an SMS message, the QR code conveys the destination address (e.g., including but not limited to a telephone number) that is to be used and/or pre-populates the contents of the text portion of the SMS message. Thus, in these particular embodiments, the user does not need to enter this information, and such capability may avoid the user from mistyping or incorrectly completing such information.

Figure 2A:
FIGS. 2A and 2B show one embodiment of a quick response code and its application with respect to a GPR card for facilitating access to a contact center.

FIG. 2A illustrates a QR code 222 according to one embodiment. Because each QR code 222 encodes data in a pattern, the pattern may vary based on the encoding format and data. For example, one encoding format allows up to 7,089 characters to be encoded in the pattern, while another format allows 2,953 bytes to be encoded. The embodiment of the QR code 222 illustrated in FIG. 2A encodes a destination address in the form of a telephone number 223, which in this case is (404) 851-1331. The QR code 222 also encodes a text message 227 for the body of the SMS message, which in this embodiment encodes the text "What is the account balance for account number 12345678910111121?" Thus, in this embodiment, a pre-populated text message is addressed to the destination address with the contents indicated therein upon reading the QR code using a smart phone. Other embodiments may encode the destination address as a so-called "short code." The text may be presented to the user by the mobile application along with a prompt for the user to confirm that the text message should be sent. In other embodiments, the message can be immediately sent without waiting for the user's confirmation.

Although the text message may be easily comprehended by a human, its contents may be consumed (parsed) by a receiving computer system in a contact center. The contact center may parse the message for certain key words or phrases, such as "account balance" and the account number. The destination telephone number 223 may have been established for processing of text messages associated with account balances (as opposed to being directed to an agent). Other syntax formats could be used for the text message. For example, the SMS message could have been structured using a number of well known protocols, which can be parsed by the receiving computer system. Thus, because the text message is pre-populated by data encoded by the QR code, as opposed to being entered by the user, the text message can be interpreted by the contact center for performing a particular function. Encoding the account number into the QR code offers the benefit of avoiding the user having to enter this manually, which can be error prone.

Figure 2B:
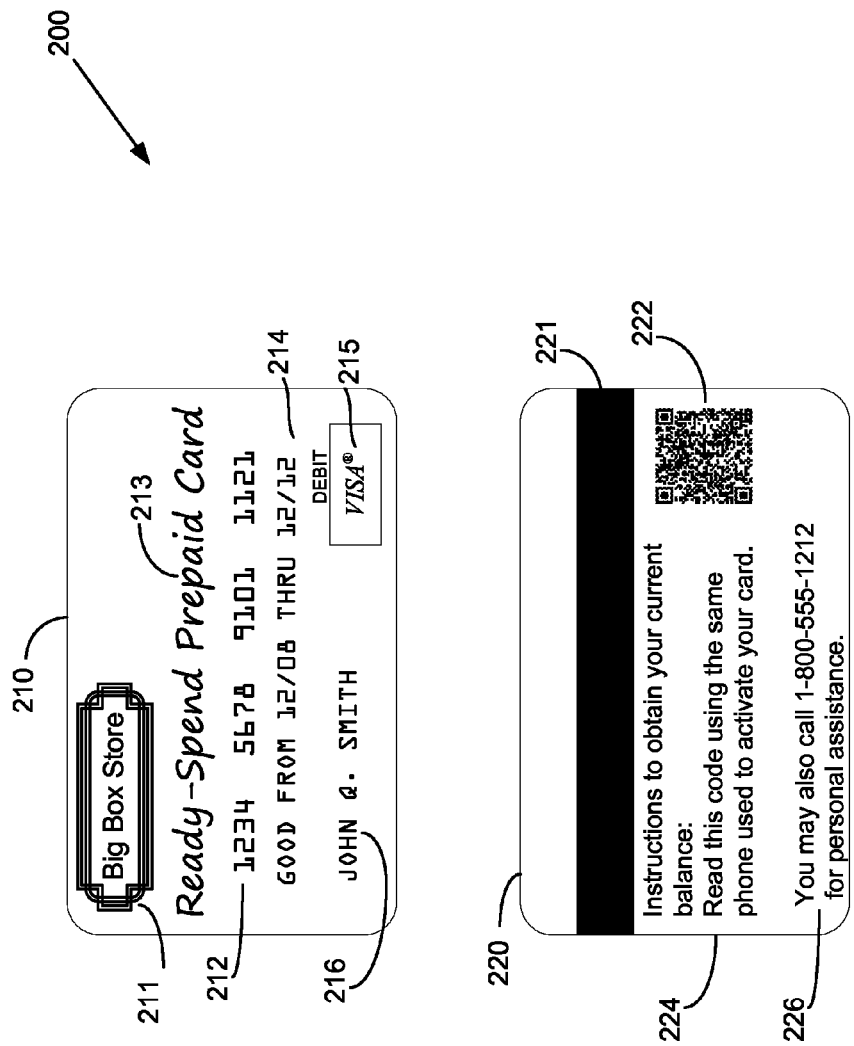

FIG. 2B illustrates one embodiment for providing a QR code 222 on a GPR card 200. Typically, this is provided as indicia printed on the card. Specifically, FIG. 2B illustrates the front side 210 of the GPR card 200 and a back side 220. The front side 210 may have an indication of a brand 211 of the GPR card. This could be a particular financial institution, retailer, or other business. In this embodiment, the GPR brand 211 is that of a nationwide big box retailer. A name 213 of the card may be provided, which may distinguish this particular GPR card from other GBR card types offered by the same card source. The account number 212 is typically a series of digits identifying the account that conforms to defined standards. Dates 214 are shown that indicate when the account is valid.

The card 200 is associated with an account holder, and that person's name 216 is typically embossed in characters on the card. A financial payment network may be indicated, such as shown by the VISA® logo 215 or other name.

The back of the card 220 comprises a magnetic stripe 221 which can be read by conventional card readers and encodes various information in a standardized format. An instructional message 224 may be provided informing the user how to use the QR code 222 for ascertaining the balance or performing some other function. The instructional message may vary, as there are various ways in which the QR code can be used, as will be seen. In one embodiment, the message informs the user to read the QR code using the same smart phone that was used to activate the card. An additional message 226 may be provided indicating a telephone number that the user may use to reach customer service. This number may provide alternative means (e.g., via a telephone call) for the user to obtain customer service. In addition, this number may be the same or a different telephone number than used for transmitting the text message.

The QR Code 222 may be provided to facilitate the user accessing their account balance, to review the terms of use, receive notifications of changes to the terms of use, provide information regarding recent purchases, or other information. The form of communication associated with the QR code may also vary. Specifically, reading the QR code may cause the smart phone to display information (only), access a web site (which can also display information, but allows user interaction), generate an email, initiate a voice call, invoke an application, or generate an SMS message. The specific response to reading a QR code can vary, and other variations are possible. As it will be seen, the QR code reader can be an application provided by the GPR card provider to not only read the QR code, but facilitate providing other GPR card related functions to the user.

Figure 3:
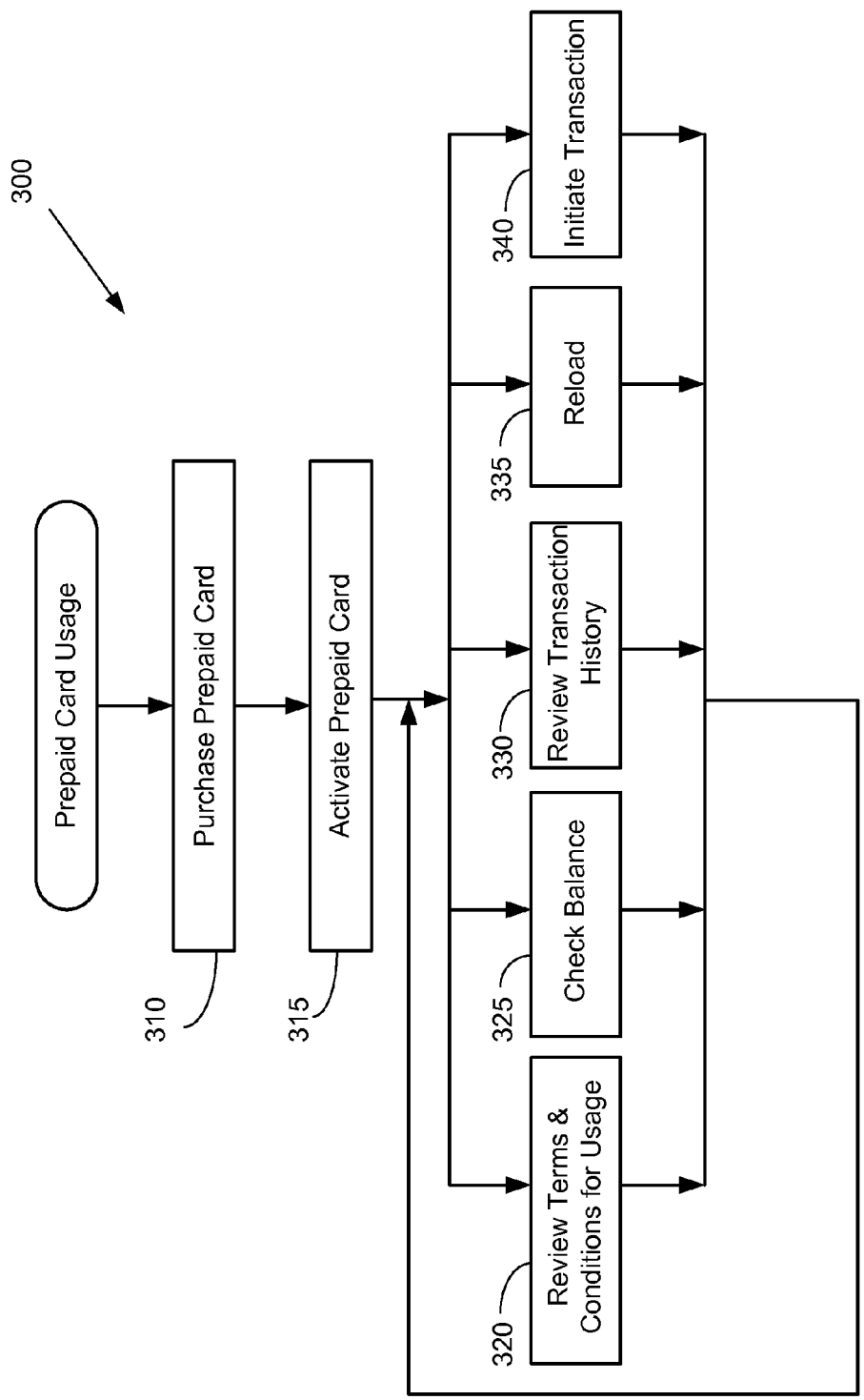
FIG. 3 shows one embodiment of a process flow of actions a user can take with respect to a GPR card.

The actions that a user may take with respect to using the GPR card itself are shown in FIG. 3. The process 300 shows some of the common user actions and these are independent of how the user actions may be communicated. Later, some of these user actions will be associated with using a QR code. References to "user actions" with respect to using the GPR card are distinct from "actions" encoded by a particular QR code, although there may be a linkage between the two.

The initial operation 310 involves the user purchasing the prepaid card. This may occur on-line, at a retailer, or financial institution. The user is required to provide identifying information, which may include name, address, date of birth, social security number, driver's license number, email, and/or telephone number. This information may be required by financial institutions consistent with federal regulations to identify the account holder. In some embodiments, the individual user using the card may be different from the person who opened the account. For example, a parent may obtain a card, and allow their child to use it.

While a telephone number may not always be required to obtain a GPR card, having this information allows the card provider to link or associate the telephone number with the account so that any communication originating from the same telephone number can be used by the card provider to verify that the user is the authorized account holder. Similarly, obtaining the user's email address may allow the email address to be linked to the account as well. Thus, if the contact center receives an email from an originating address inquiring about an account, this email address can be checked against the originally provided email address.

The GPR card may be mailed via postal service to the card user, since the card typically has the user's name embossed on the card (which is another reason why the user's name and address is provided when applying for the card). The GPR card may have the QR code printed on the back of the card. In some embodiments, additional printed materials may be provided to the user in the same mailing. These additional printed materials may also have QR codes, which can be used for the same or other functions, as will be seen.

Once the card is received, the card is typically activated by the user in operation 315. Activation may involve the user calling into an automated system from a telephone number associated with the account to activate the GPR card. Using a smart phone that has the same calling party telephone number (a.k.a. ANI) as indicated in the account application information allows the contact center receiving the call to verify the call is, in fact, originating from a telephone number linked to the GPR card account. In other embodiments, the user may speak with an agent, who then activates the card. It is also possible to use the ANI of the smart phone used to activate the GPR card as the telephone number of the authorized user, if this ANI is different from the telephone number originally provided with the application. In some embodiments, a second telephone number (such as the number used to activate the GPR card) can be associated with the account. At this point, the card is ready to be used for purchase transactions.

The primary purpose of the GPR card is to initiate purchase transactions, shown in operation 340. A transaction can be a "PIN" type transaction or a "signature" type transaction. This refers to whether the user at the point of purchase enters a PIN code or signs their name on the card reader. Although the PIN transaction type mimics the user procedure for a debit card transaction, and the signature transaction type mimics the user procedures for a credit card transaction, both forms are a prepaid debit card transaction.

Another card usage action that the user may initiate after purchase transactions is to reload the card in operation 335. Reloading the card involves adding additional funds to the account, increasing the balance. A user may deposit payments into the account, or replenish the account via a cash payment.

Initiating a purchase transaction and reloading the card may be distinguished from other type of actions, which are referred to herein as card administration and management ("CAM") actions. CAM actions are ancillary to purchasing or reloading the card (although reloading the card could be considered by some to be a CAM action). Three common CAM actions are shown in FIG. 3, and these are;
 1) reviewing the terms and conditions in operation 320,
 2) checking the balance in operation 325, and
 3) reviewing the transaction history in operation 330.

The set of actions constituting CAM actions may vary from what is depicted in FIG. 3, and may include other actions which are not shown. The CAM action is typically indicated as an explicit or implicit communication request, and a response communication is received. For example, reporting a lost or stolen card can be considered a type of CAM action, but its occurrence may be relatively infrequent as compared to checking the current balance or reviewing recent transactions. Further, as will be seen, different CAM actions may require different forms of access by the user. In other words, a given form of communication may not be well suited to perform all types of CAM actions.

Of the CAM actions shown in FIG. 3, checking the balance 325 is likely the most common. Users may not readily recall their account balance, and one industry standardized approach involves using an ATM machine to check the balance. While ATM machines are networked to provide ubiquitous access to users, fees are typically charged to the user by the GPR card provider for using an ATM machine. Further, a user may not have ready access to an ATM machine when the need arises to check the balance. Finally, depending on the time and location, users may be hesitant to use an ATM for fear of personal safety (e.g., robbery).

Some GPR card providers may offer alternative approaches for allowing a user to check their balance. A paper or electronic transaction history can be provided to the user, but again these may not be available when desired, and mailing a paper statement would be relatively expensive. A customer agent could provide information to the user generating a call to a customer service number, but users may incur wait times which are undesirable. On-line or automated methods may be offered, but in some cases these are not convenient or easy for users to access.

Many GPR card users also use smart phones. Many of these smart phones also have wireless voice and data access. The QR code on the GPR card can be used as an easy means for the user to perform CAM actions, including commonly used CAM actions such as checking the account balance. Further, QR codes processed by smart phones can also be used to ensure that the information provided to/from the user is conveniently formatted and can minimize data entry errors. For example, presenting information in a text message on a smart phone is more likely to be more readable than using a mobile browser for accessing a conventional website (i.e., a website that is not designed for mobile browser access).

Figure 4:
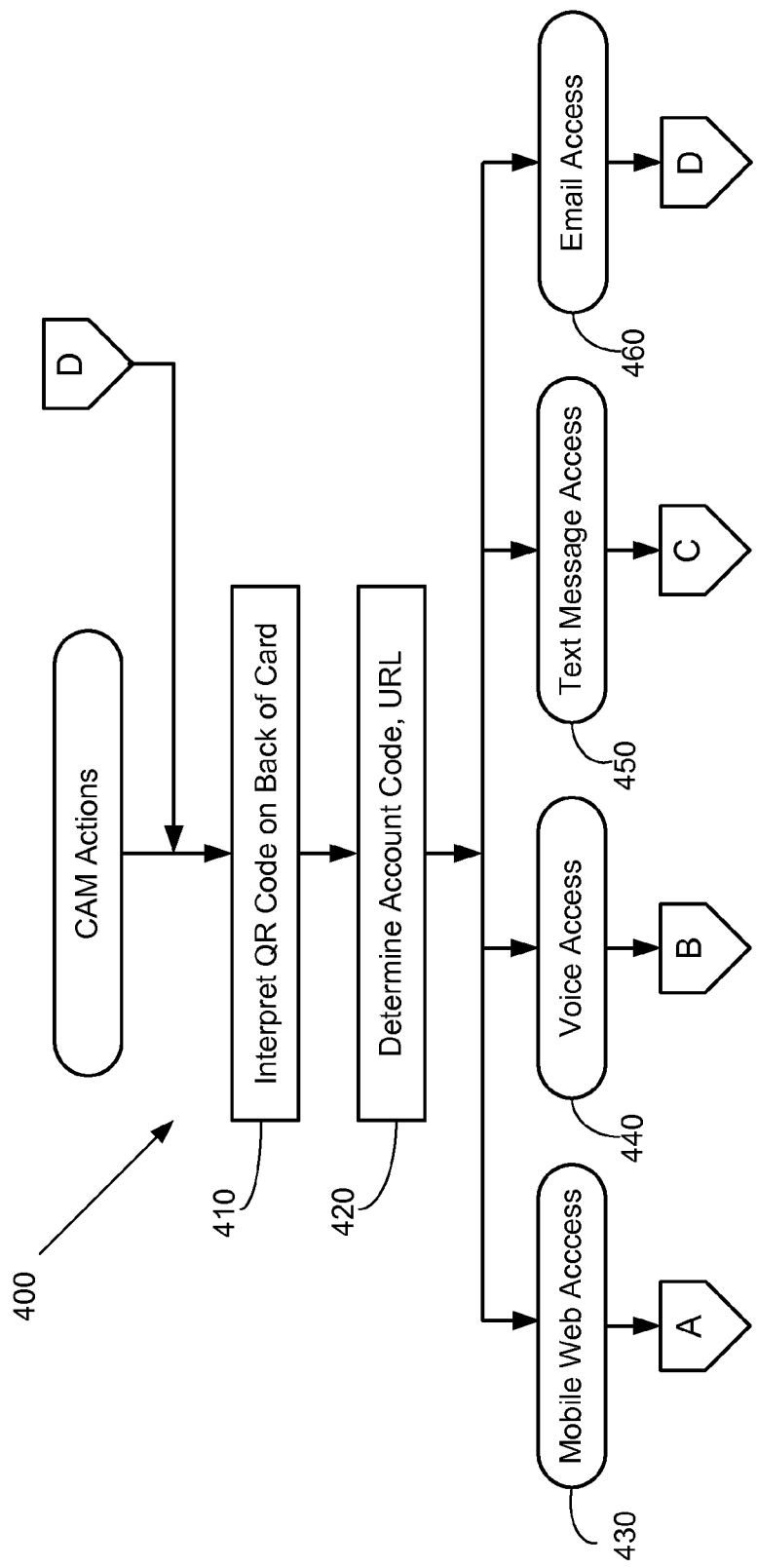
FIG. 4 shows one embodiment of a process flow associated with reading a quick response code on a GPR card and different access modes to a contact center.

QR codes can be used with GPR cards to allow the user to perform CAM actions in various access modes, including four primary access modes. These access modes correspond to actions that can be encoded in QR codes and include: mobile web access, voice access, text message access, and email access. These access modes are illustrated in FIG. 4. FIG. 4 illustrates a process flow 400 that could be associated with performing CAM Actions. In many embodiments, a particular CAM action may be accessed in one of the various indicated modes; in some embodiments, two or more access modes may be provided for accomplishing a particular CAM action. The actions described herein may be different, based on the mobile application used to read the QR code. As will be seen, a custom mobile application provided by the GPR card provider may provide different actions.

FIG. 4 presumes that the user has received and activated the GPR card. In the embodiments described herein, the user is presumed to have a smart phone with an appropriate mobile application for reading or scanning QR codes. The smart phone is presumed to have voice service (which is used for voice access 440), and potentially wireless data service (for using web access 430, text message access 450, or email access 460). In some embodiments, the code reader can be a QR code reader, which can be readily loaded onto the smart phone, or it could be a QR code reader already loaded onto the smart phone. In other embodiments, the code reader may be a proprietary code reader. In some embodiments, the code reader may be a mobile application provided by the GPR card provider, which can facilitate security and provide further features tailored to CAM actions associated with the GPR card.

Returning to FIG. 4, the user begins by scanning the QR code on the back of the card to perform the CAM actions. The card reader mobile application interprets the QR code in operation 410 after the smart phone scans the QR code. The QR code can convey data that is uniquely associated with the user's account, which can be the account number itself, and potentially include the user's name or other information. The encoding of the account number via the QR code conveys information that is readily discernible on the front of the card, and in doing so does not encode any confidential information.

The QR code may also encode information associated with the access mode, including a URL, telephone number, or email address. The URL can be used to access a customer service web site, the telephone number can be used for placing a voice call or text call to a customer service representative or automated system, and the email address can be used to send an email message to a customer service representative or automated system.

FIG. 4 illustrates one of several types of communication which can be initiated by scanning the QR code. It should be noted that while a QR code typically indicates which type of communication to initiate, the GPR card may have more than one QR code. For example, a first QR code could be provided for initiating voice contact, and a second QR code could be provided for initiating email contact. Other variations are possible. Further some mobile application programs can be designed to provide further flexibility. For example, a GPR card specific mobile application could be designed to read the QR code, which encodes a telephone number, and provides the user with an option for determining whether to initiate a voice call or a text call to the destination telephone number depending on whether a voice call or text call is desired.

Figure 5:
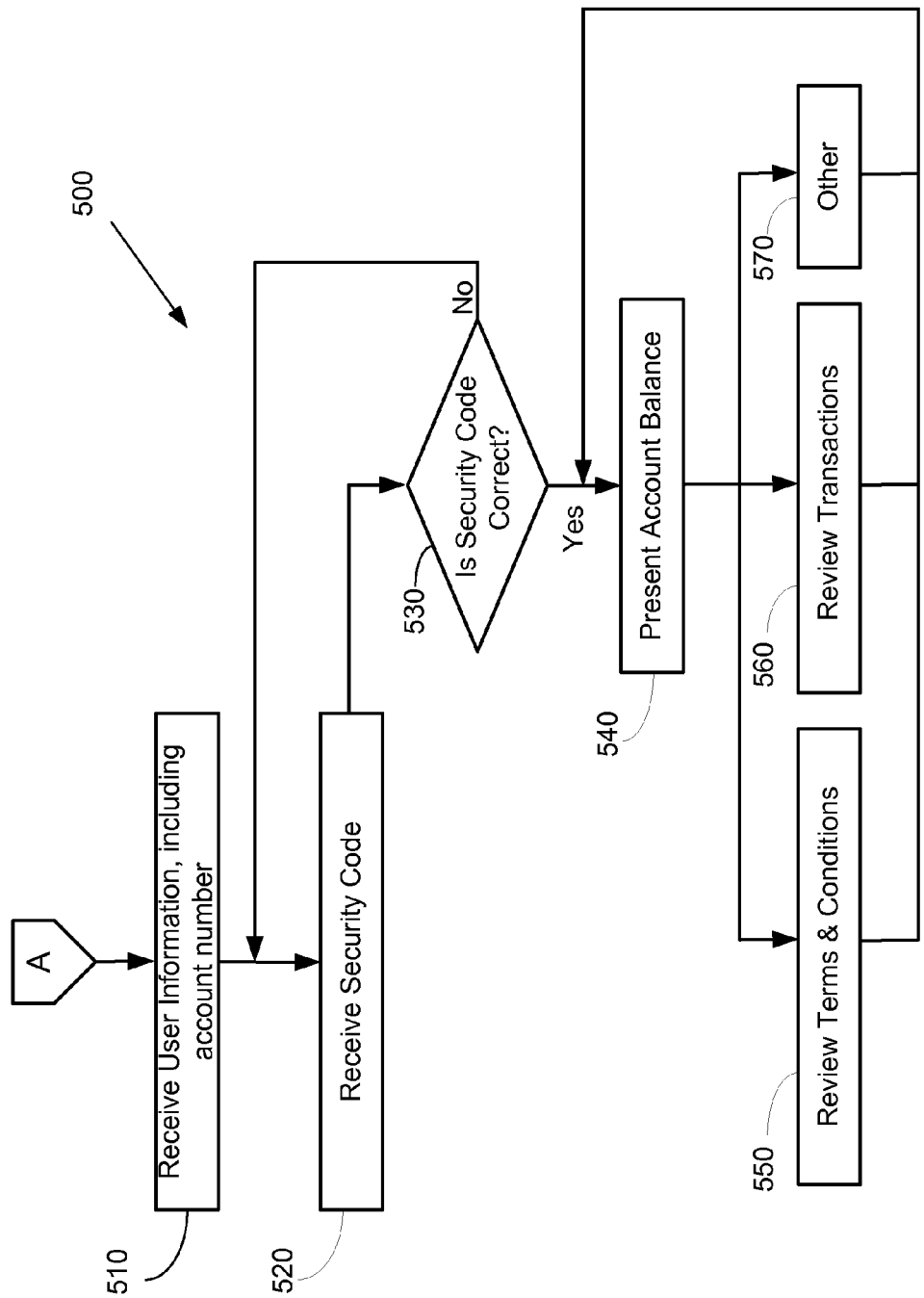
FIG. 5 shows one embodiment of a process flow that involves a mobile device accessing a web site associated with the contact center in response to reading the quick response code.

Turning to FIG. 5, a process flow 500 is shown for a web site providing customer service to a mobile device, such as a smart phone. Because the web site is designed for viewing on a mobile device, the contents of the web site are easily viewable on the smart phone as opposed to a web site designed for conventional browser access.

The information about the user's name and/or account number, as well as other information readily visible on the face of the card, can be conveyed to the web site in operation 510. The web site is thus informed of the account number and does not have to prompt the user to enter the account number. The user manually entering the account number can take additional time, and may be error prone when using a smart phone. Validation of the user may be required by prompting entry and receiving a security code in operation 520 to ensure that the authorized user is accessing the account information. The user may be prompted via the web site to provide information such as a PIN, security code, name, or other validating information. The nature of validating information may vary according to embodiments. In some embodiments, a security code for validating the user is not required and operation 520 is optional. For instance, it may possible to verify the smart phone has been previously associated to the account by use of cookies deposited onto the smart phone (if supported) when the GBR card was activated or when a previous CAM action occurred.

Assuming that the correct security code information is provided in operation 530, the web site in operation 540 may present the current account balance to the user, potentially along with other menu options. The account balance may be provided on the initial web page, or it may be available as a separate menu option (see, e.g., discussion below with respect to FIG. 11). In particular embodiments, operation 540 presumes that most users accessing the web site will want to know account balance information even if that was not the information sought by the user, so the account balance is initially presented. The user may then select other CAM actions, such as review the terms and conditions in operation 550, review recent transactions in operation 560, or select other functions in operation 570. Other functions could include requesting a paper statement, reporting a lost or stolen card, or reloading the account. Accessing a mobile web site provides significant flexibility in allowing the GPR card user to indicate a CAM action, and allows detailed information to be presented in text form by the card provider to the user. For example, providing a transaction history or a description of the fee schedule is readily possible. Although not shown in process 500, an icon may be provided to allow the user to exit from the web site.

Figure 6:
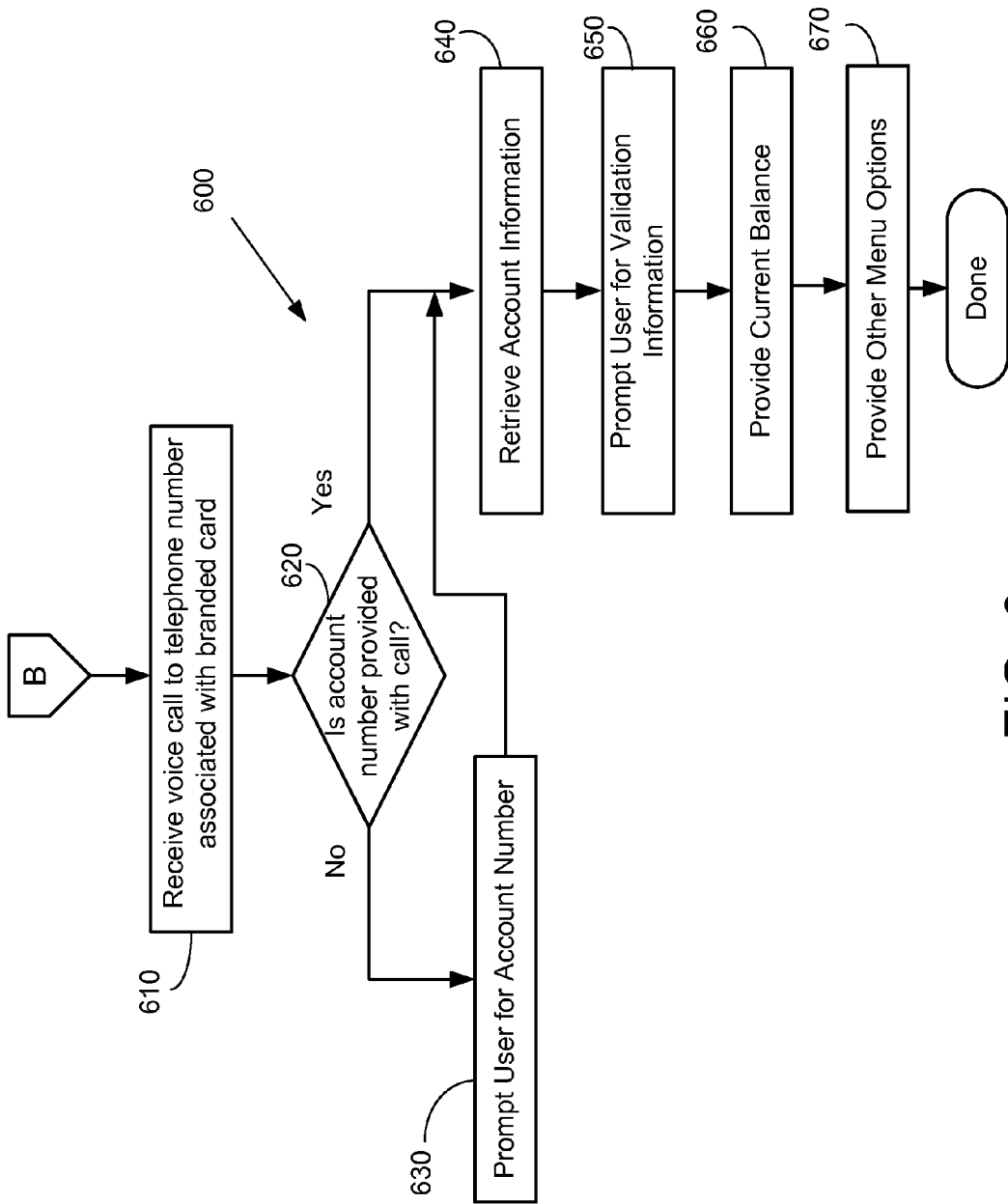
FIG. 6 shows one embodiment of a process flow involving a mobile device initiating a voice call to the contact center in response to reading the quick response code.

FIG. 6 illustrates one process 600 flow where reading the QR code causes a voice call to be initiated by the smart phone. The voice call can be initiated in different forms, depending on the mobile application. In one embodiment, the mobile application, upon reading the QR code, causes a telephone call to be initiated to a telephone number using the wireless cellular telephone capability of the smart phone. The mobile application may prompt the user to confirm that a call should be set up. The voice call initiated in operation 610 is received at the system, where the voice call is directed to a destination telephone number encoded in the QR code.

The voice call initiated can also be a VoIP type call, where a mobile data service is used to convey voice. This could be initiated by a mobile application (such as Skype®) generating a SIP or SIP-like voice call over the data service available to the smart phone.

In order to provide information about the account to the user, the account number must be first conveyed to the contact center. In some embodiments, additional data could be conveyed with the call when the voice call is initiated. For example, user-to-user data could be included in the voice call signaling so that when the call is setup, the account information is provided as well. Alternatively, account information could be provided in a text message sent contemporaneously to the same telephone number. Those skilled in the art will appreciate different ways account information could be provided in conjunction with the voice call, as shown in operation 620 of FIG. 6.

If the account number is not provided in operation 620, then in operation 630 the user would be prompted to enter the account number. This could be provided via speech, DTMF, or a combination. Such data entry techniques are well known to those skilled in the art.

Once the account is known by the call center, then in operation 640, the account information, including the account balance, can be retrieved by the contact center. In operation 650, the system prompts the user for validation information, if required. This information could be based on user provided information that was included in the original application for the GPR card, such as address, date of birth, driver's license number, or social security number. Alternatively, the information may be based on information provided to the user when the GBR card was provided, such as a PIN code. In other embodiments, the ANI or calling party number received with the call may be used by the call center to verify the caller is the authorized user. For example, if the same calling party number used to activate the GPR card is then used in a subsequent communication to check the balance, the contact center may presume that the user is authorized. In some embodiments, operation 650 may not occur, as validation of the user may not be required.

In operation 660, the user is provided with the account balance. This may be provided using an automated text-to-speech system. A menu structure may be provided to the user in operation 670 for invoking other CAM actions. For example, an IVR menu structure for allowing the user to select functions for account transactions, statement dates, terms and conditions, etc. may be provided. At this point, the process can be completed by the user hanging up, exiting the system or performing other appropriate actions. In some embodiments, the response is provided to the user in a different form, such as an email message or text message sent by the contact center using the contact information established when the card was initially requested.

The telephone number encoded by the QR code can be selected by the card provider to be uniquely associated with the brand of the GPR card. Thus, when the call is received by the contact center, the dialed number itself can be used by the contact center to determine the GPR card brand. It is possible for a card provider to issue different types of GPR cards within a single brand, each with different terms and fee arrangements. Thus, the dialed number could be used to identify which card brand, or type of card within the card brand is involved. In some embodiments, the contact center may service various GPR cards, including those of various brands and types within the brands.

The voice access mode for performing the check account balance CAM action allows the user to easily check the account balance without incurring ATM usage fees. Further, the voice access mode does not require the smart phone have wireless data access. This access mode may involve manual entry of the account number by the user, and may not be as suitable for other CAM actions (such as reviewing lengthy terms and conditions of GPR card usage).

Figure 7:
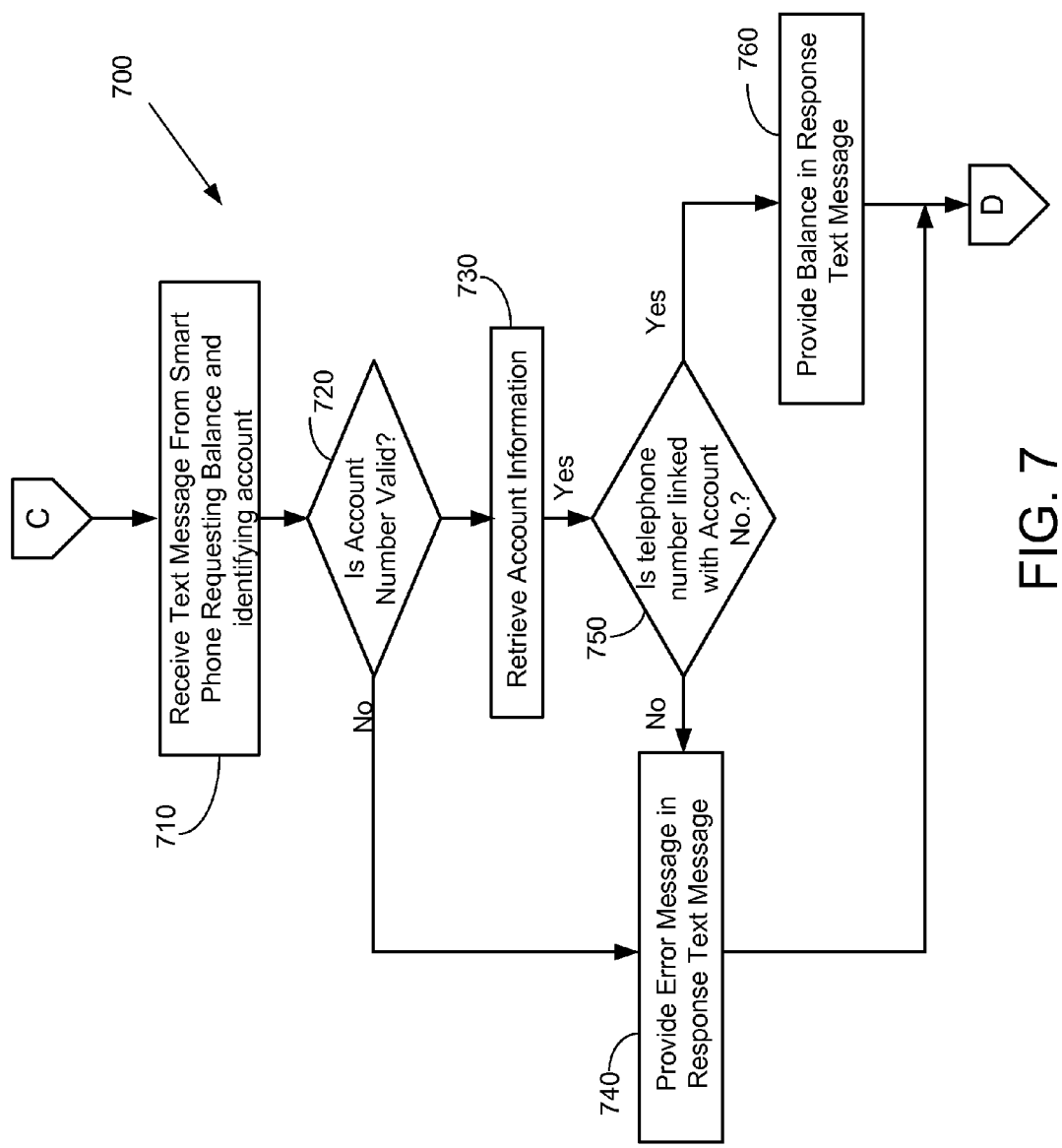
FIG. 7 shows one embodiment of a process flow of a mobile device transmitting a text message call to the contact center in response to reading the quick response code.

A third form of access that can be used for a CAM action is transmitting an SMS or text message from the smart phone to the contact center in response to reading the QR code. This mode of access is shown in the process flow 700 of FIG. 7. In FIG. 7, the smart phone sends a pre-populated text message based on reading the QR code on the GPR card in operation 710. The message contains the account number and/or account holder's name (as well as potentially the expiration date information) which is shown on the front of the card. The destination telephone number (a.k.a. called number or dialed number), can be used by the contact center to ascertain the GPR card type or brand of card as described above. Alternatively, a so-called "short code" can be encoded by the QR code and used to address the text message to the contact center. Using a text access mode allows the user to easily obtain account balance, and the text response may include other information, such as a list of the recent transactions, e.g., the past two purchases. Because in many embodiments the text size of a text message is limited to approximately 160 characters or less, text access may be limited in the information that can be provided by the contact center.

Upon receiving the call, the originating telephone number of the smart phone is provided to the contact center. This allows the contact center to not only know the account number of the user, but the (originating) telephone number as well. The contract center uses the account number to first verify whether the account number is valid in operation 720. If the account number is not valid in operation 720, then an error message is provided in a response text message in operation 740.

If the account number is valid in operation 720, then the account number is used to retrieve account information in operation 730. The account information may include the account balance, the user's name, indicated telephone number, address, etc. Retrieving the account information may include retrieving the user's account telephone number which allows this value to be compared with the originating telephone number received with the call in operation 750. If the originating telephone number and the account telephone number do not match, then in operation 750 the contact center can provide an error message as shown in operation 740. If there is a match, then the account balance information is provided in operation 760. Since the ANI and the account telephone number match, it can be assumed the caller is the authorized user and it is appropriate to provide the account balance to the caller. The response is provided in a text message which is sent to the originating telephone number.

Although in many instances text messages incur a charge from the wireless service provider, or are accounted for in some manner for billing purposes, fees associated with ATM usage can be avoided (which may be far greater than the text message usage fees). Further, using text messaging avoids the user from being physically present at an ATM machine to perform a balance inquiry. In addition, text access has the advantage that no voice calls have to be initiated (which may be impractical in a noisy environment), and the process is relatively fast.

Figure 8:
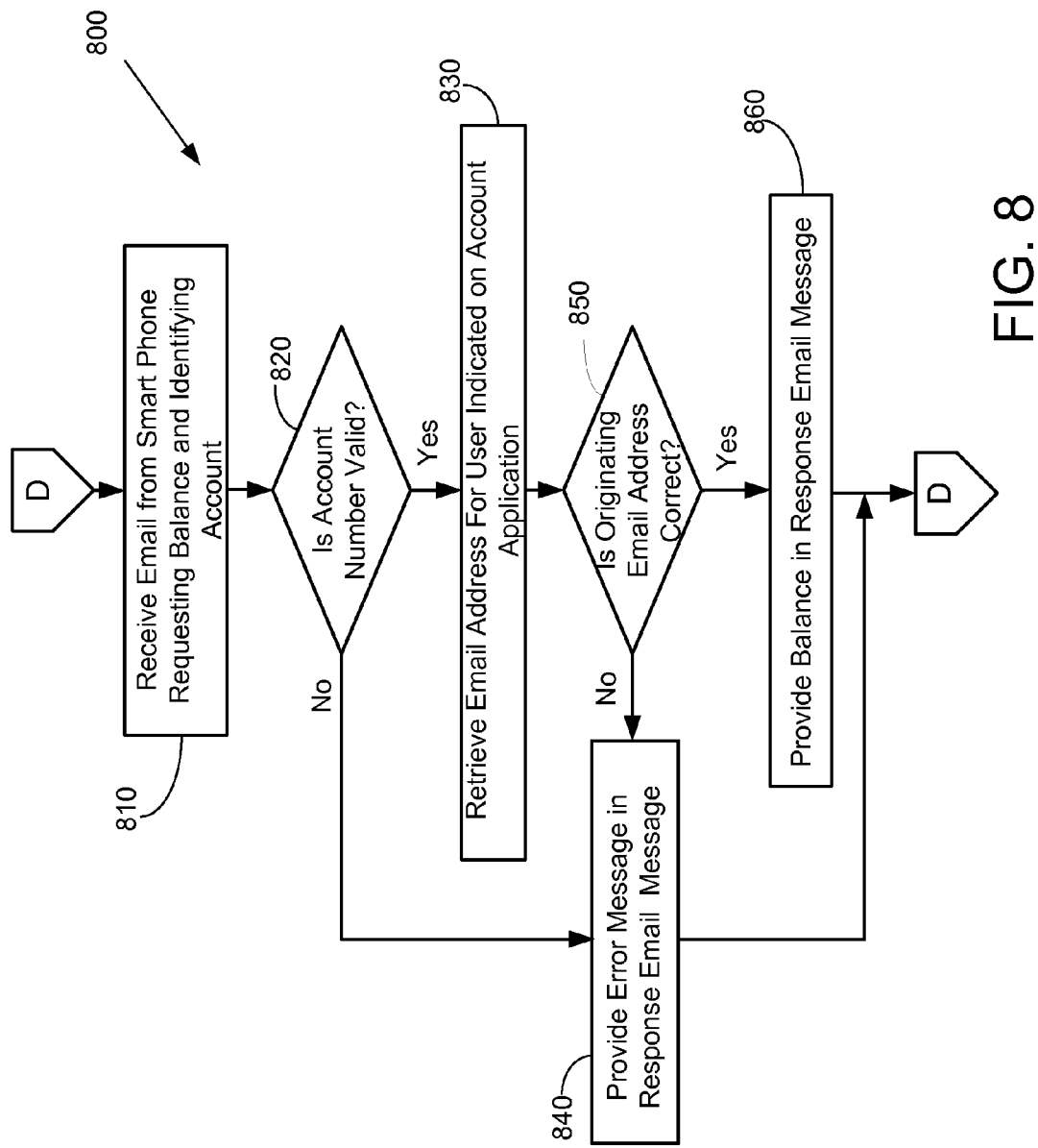
FIG. 8 shows one embodiment of a process flow of a mobile device transmitting an email message to the contact center in response to reading the quick response code.

FIG. 8 shows another form of access that is possible when reading a QR code on a GPR card, and this form is based on email communication. This mode of access is shown in the process flow 800 of FIG. 8. Upon reading the QR code, an email message with its contents pre-populated is generated and sent to a destination email address and received as shown in operation 810. The email contents may include the user's account number and/or name, and the destination email address can be unique to the card type or brand.

Upon receipt by the contact center in operation 820, the account number is parsed and the account number is analyzed to determine if it is valid. If the account number is invalid, then in operation 840 an error message is provided in a response email message. Otherwise, in operation 830 the user's email address in the account information is retrieved and checked with the email address to determine if they match in operation 850. Verifying that the email originated from the same address associated with the account indicates that the request is coming from the account user. If the originating email address is different from the user's email address kept on file, then this may be indicative of an individual attempting to hack into the account. If the email addresses match in operation 850, then the balance is provided in a response email message in operation 860. In some embodiments, the verification of the originating address is not checked with the corresponding information obtained when the card was initially obtained.

Each of the above process flows illustrates one embodiment for using a QR code to access information, such as balance information. The choice of access (web, voice, text, or email) may vary with different factors. For example, email communication is frequently recognized as being slower than text messaging, but often text messages are associated with usage fees from wireless carriers. Web access is relatively quick, but may require additional infrastructure by the GPR card provider. Each form of access may have different advantages over another form.

There are numerous variations that one skilled in the art can develop in regard to each of these process flows based on human factors and other design aspects. Web access allows easy access to all types of information, but may be difficult for certain users to use on a smart phone. Voice access may allow quick access for specific information, but providing lengthy details of terms and conditions may be impractical. Email may be too slow, but it can request and receive a variety of types of information. Since the most common application is likely to check for account balances, the examples provided herein focused on this particular CAM action, but other variations are possible for other CAM actions.

Figure 9:
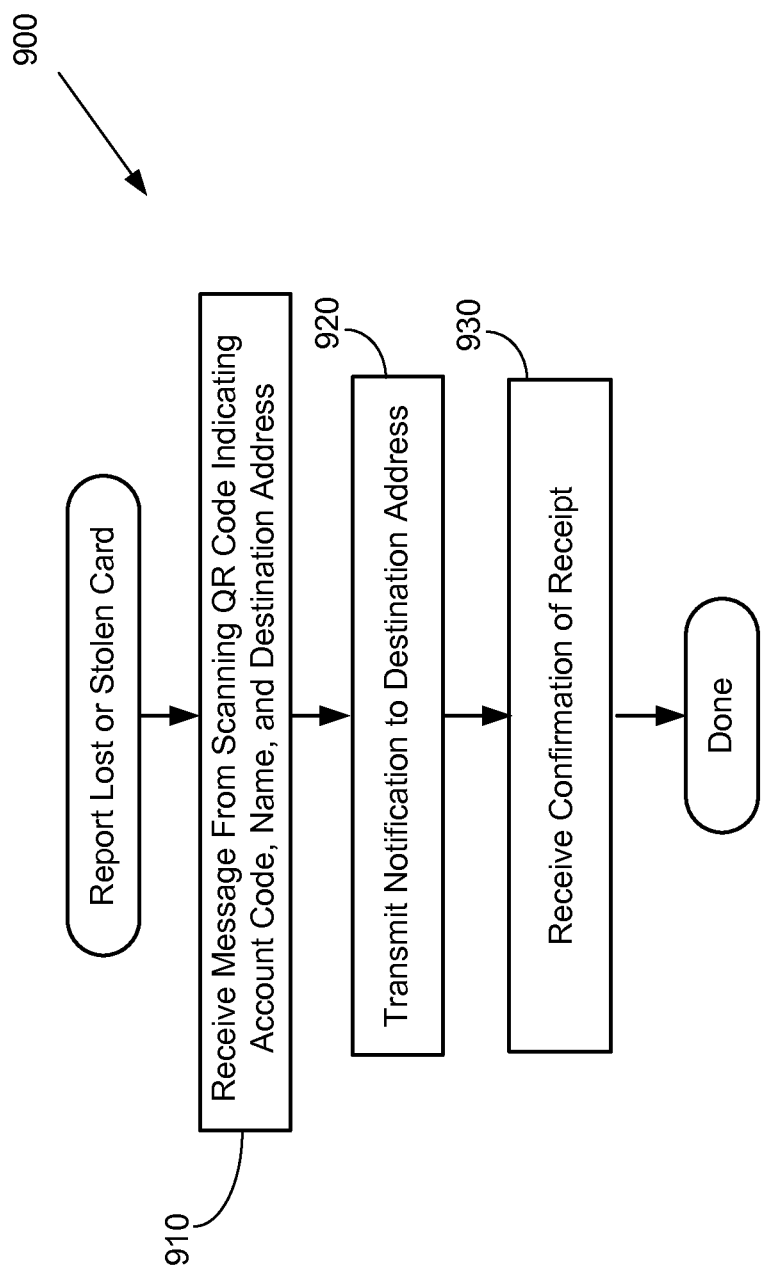
FIG. 9 shows one process flow for reading a quick response code for reporting a lost or stolen GPR card.

The use of QR codes can also be associated with GPR cards in other ways. For example, when a user receives their card, a letter may be provided with the card conveying instructions for reporting a lost or stolen card. If a card is lost or stolen, some card providers require prompt notification. The letter may have a separate QR code that encodes the user's account number, name, and which causes communication to be directed to a destination address dedicated to the reporting of lost or stolen cards. The process flow 900 is shown in FIG. 9, which comprises the operations of scanning the QR code in the letter in operation 910. The QR code may encode the account number, the user's name, and a dedicated destination address for reporting lost or stolen cards. This destination address may be e.g., a URL, telephone number, or email address. In operation 920 the notification is received at the contact center. In operation 930, a response is received confirming that the lost or stolen card is recorded. The response may be sent to the entity originating the request, or the response may be sent to an email address or telephone number associated with the account.

In the absence of such a QR code dedicated for reporting lost or stolen cards, the smart phone may retain a copy of a prior communication, or at least the destination address information, whether it be URL, telephone number, or email address of a prior CAM action. If the GPR card is lost or stolen, this address information may be retrieved and used to report a lost or stolen card. Obviously, in such circumstances, the user does not have the GPR card, and cannot scan the QR code on the card. However, the user may be able to initiate communication with the correct account number so as to report this situation.

Figure 10:
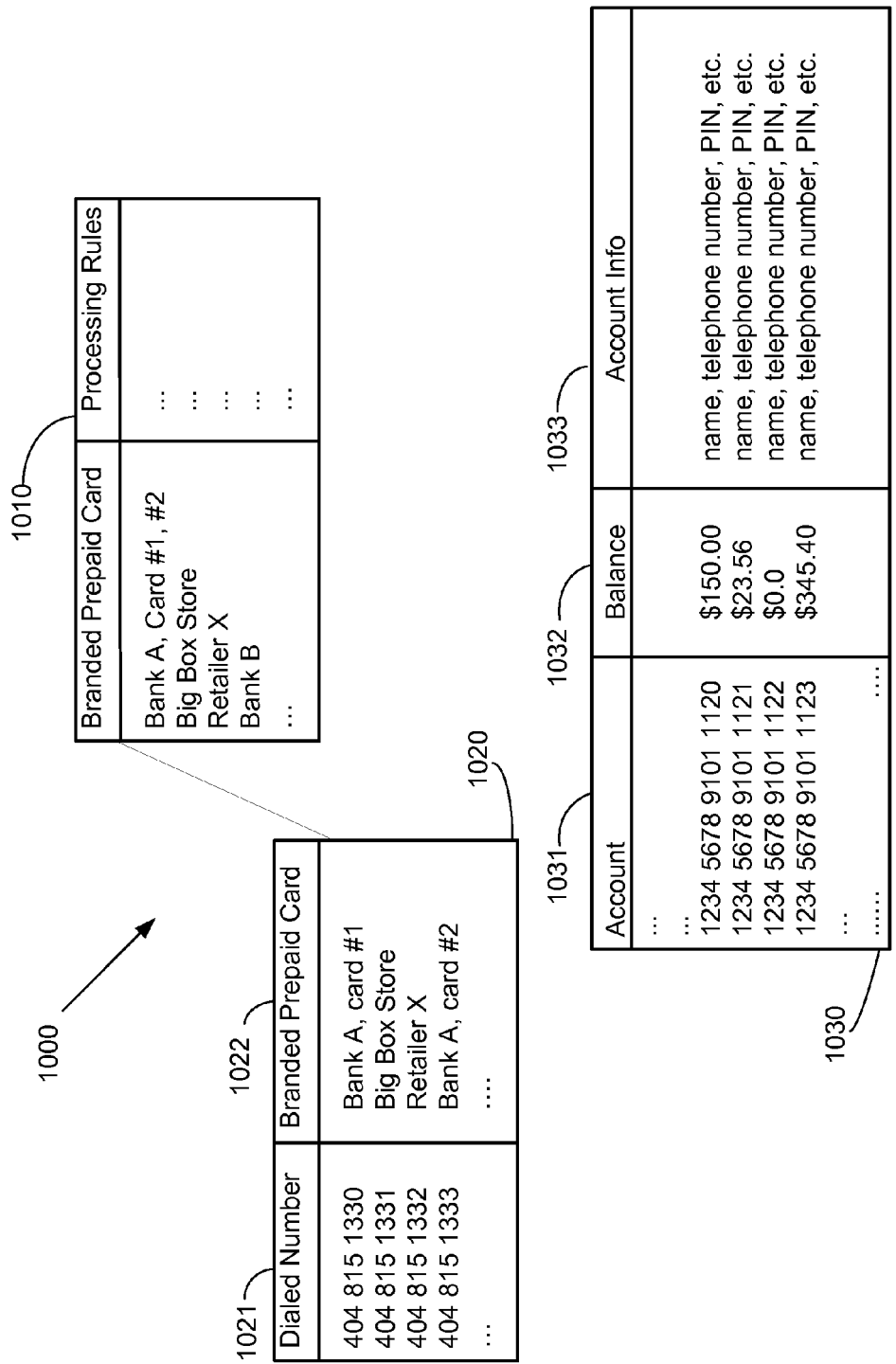
FIG. 10 shows one embodiment of data structures used in processing communication associated with reading the quick response code.

As noted before, the destination address encoded in a QR code may, by itself, be used by the receiving contact center to ascertain information about the GPR card involved. This may be reflected in various data structures that may be used in the contact center. Turning to FIG. 10, various exemplary data structures 1000 are shown. The first data structure 1020 maps the dialed number to a particular GPR card brand or card provider. For example, the first column 1021 indicates a dialed number, which is received at the contact center. The first data structure may have a second column 1022 mapping the number to a particular card provider and/or card type. Examples are shown of GPR cards that are associated with three different providers: Bank A, Big Box Store, and Retailer X. The dialed number can also indicate the type of card from a given provider. Specifically, note that Bank A has two types of cards—Card #1 and Card #2. Thus, for example, calls (including voice or text calls) received at telephone number (404) 815-1330 are associated with card #1 from Bank A, whereas calls received at (404) 815-1333 are for card #2 from Bank A.

The contact center may have another data structure 1010 that defines processing rules for each type of branded GPR card. For example, certain processing rules may apply for cards #1 and #2 from Bank A, but not for other cards. The rule could state, e.g., provide balance information in a return text message only or return the result to the email address on file. Another processing rule (e.g., for a Big Box Store) may have a different set of processing rules. That rule could state, e.g., provide card balance information along with the last purchase in a response message to the user that originated the request. Further, the rule could indicate conditions, such as the response should also contain a coupon for discounts for purchases made at the store or the response should include a link for accessing a survey, coupon, prize, etc.

Another data structure 1030 provides account information for an account. This data structure may have a column 1031 of account numbers, each of which is associated with a balance indicated in a second column 1032, which is further associated with account information in a third column 1033. The account information includes: user's name, contact information including telephone number and/or email information, PIN or security code information, etc. In this manner, once the account number is received in the contact center, the balance for the user can be ascertained, and the user's name, address, telephone number, PIN code, email address, etc. can be readily determined. This data structure may be used, for example, when matching a user entered security code or PIN number with the value associated with the account for validation purposes. Those skilled in the art will recognize that in many embodiments, the information may be structured or stored in different ways in the contact center so as to maintain security. (For example, the information may be encrypted, and the PIN values shown may be actually stored in a separate file, etc.)

Various Architectural Approaches

Those skilled in the art will appreciate that there are various architectural approaches for designing how QR codes can be used to provide users the ability to perform CAM action. As noted before, scanning a QR code can cause the smart phone to access a web site and provide account information so that the user can immediately be presented with an account balance. In another embodiment, the user is provided with a menu page on a smart phone, which identifies various CAM actions that can be requested.

Figure 11:
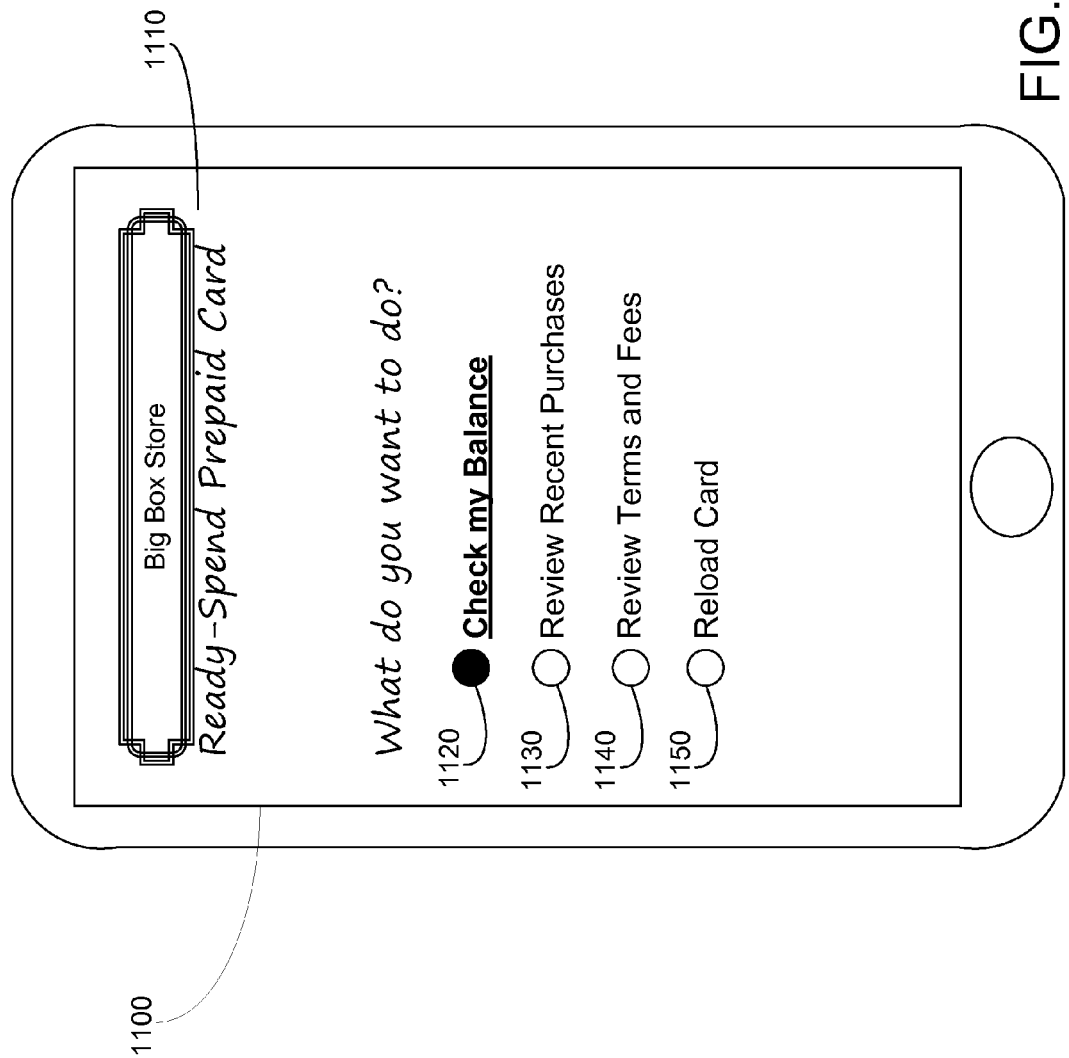
FIG. 11 shows one embodiment of a user interface on a smart phone provided in response to reading a quick response code.

One such embodiment of the menu page 1100 is shown in FIG. 11. In this embodiment, the user is presented with identification of the card brand and/or card type 1110. The user is provided with a list of common CAM actions in a menu. The first selection 1120 is to check the balance for the account. This value is shown as having been selected by the user. Other actions include reviewing recent purchases as a second selection 1130, reviewing the terms and fees in a third selection 1140, and reloading the card in the last selection 1150.

In the embodiment described above, the menu page 1100 is populated at the web server accessed by the user. In another embodiment, the menu page could be defined and provided by a specially designed mobile application downloaded from the card provider. This mobile application could have the QR code reader included with the mobile application, along with logic for interpreting the QR code, and other information designed for the user interacting with the card's QR code.

Figure 12:
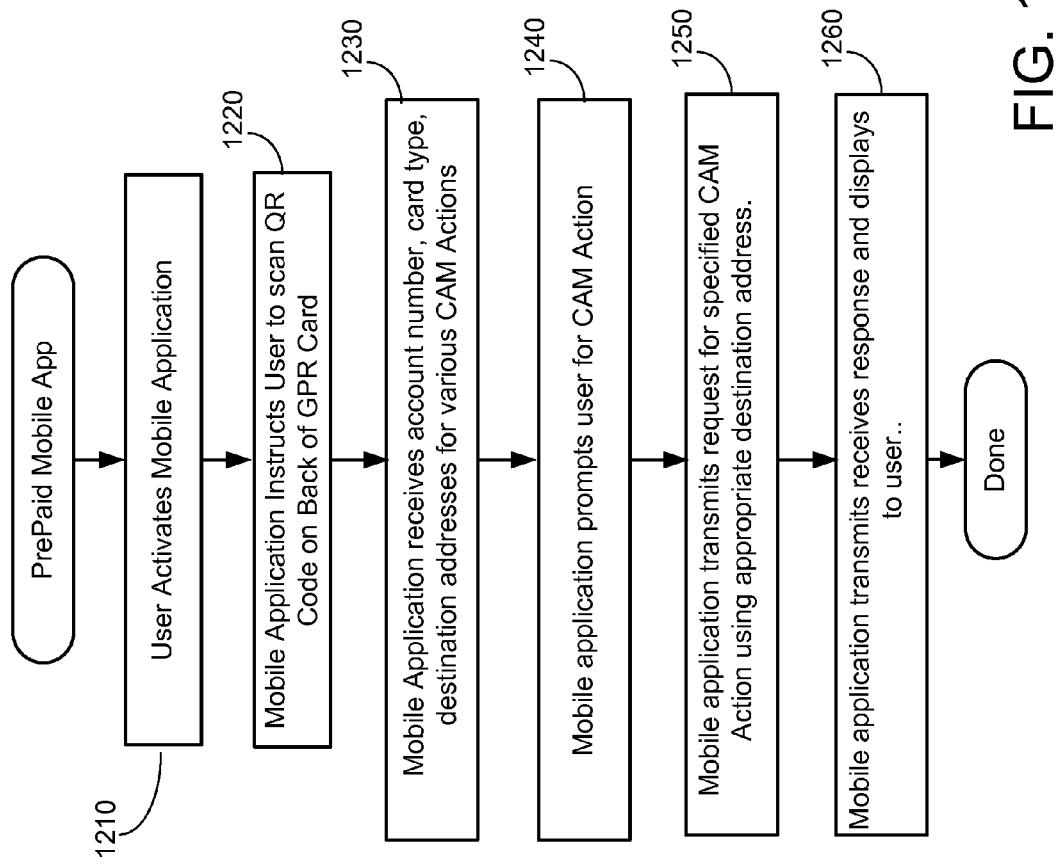
FIG. 12 shows one embodiment of a GPR card mobile application being used to perform various actions.

One such embodiment is shown in FIG. 12. In this embodiment, the user has downloaded a prepaid mobile application directed to managing the GPR card. This application may be provided by the GPR card issuers, and may incorporate additional security mechanisms. In this embodiment, the user activates the mobile application in operation 1210. The display then informs the user to scan the QR code on the back of the prepaid GPR card in operation 1220. The mobile application reads the data encoded in the QR code in operation 1230. In this embodiment, the QR code only provides data to the mobile application, and does not indicate a particular action to be performed. Rather, the mobile application reads the data, and based on logic in the mobile application, provides a menu of potential CAM actions in operation 1240 for the user to perform. This could be, for example, the menu shown in FIG. 11.

Once the user selects the particular CAM action in operation 1250, the mobile application uses the data from the QR code to initiate a communication request. The request could be via email, telephone, web access, or text. In operation 1260, the response is presented to the user. In this embodiment, the data provided upon initially reading the QR code could be retained in the memory of the smart phone, so that the user could check the balance without having to re-read the QR code to obtain the account number information. Thus, the mobile application could retain the account information and card type information so that if the card was lost or stolen, the logic in the mobile application would allow easy reporting of the same.

The mobile application can facilitate the user for registering for periodic mobile alerts. The mobile application could provide additional terms of use information for sending notifications of account balances, either on a periodic or as-needed basis to the user. Upon acceptance, the mobile application would transmit a request to the contact center, and the contact center could receive the originating telephone number that could be recorded for evidence of written consent. Further procedures for this may be found in the aforementioned co-pending patent applications incorporated by reference.

Exemplary Processing Device Architecture

Figure 13:
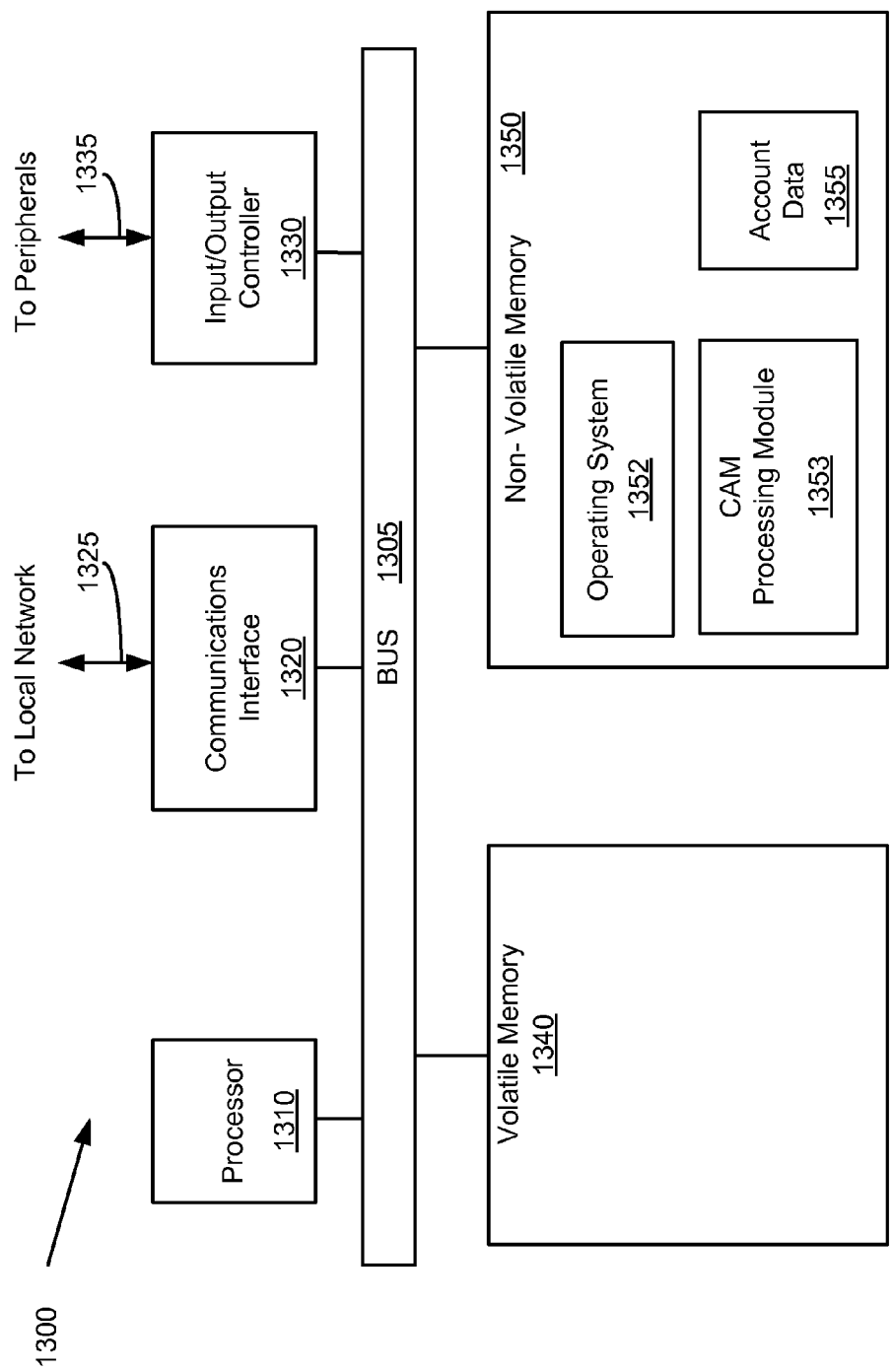
FIG. 13 is an exemplary schematic diagram of a processing device used in one embodiment to practice the technologies disclosed herein.

As discussed in conjunction with FIG. 1, the call center architecture 100 may comprise various components, such as servers, front end, databases, that comprise a processing system. FIG. 13 is an exemplary schematic diagram of a computer processing device that may be used in an embodiment of the call center architecture to practice the technologies disclosed herein. FIG. 13 provides an exemplary schematic of a processing device system 1300, which could represent individually or in combination, for example, the ACD 130, CTI server 145, dialer 150, or other component previously described. Any of these components could receive the communication initiated by a user, which may have been processed by an external or internal gateway. In general, the term "processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 13, the processing system 1300 may include one or more processors 1310 that may communicate with other elements within the processing system 1300 via a bus 1305. The processor 1310 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1300 may also include one or more communications interfaces 1320 for communicating data via the local network 170 with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1330 may also communicate with one or more input devices or peripherals using an interface 1335, such as, but not limited to: a keyboard, a mouse, a touch screen/display input, microphone, pointing device, etc. The input/output controller 1330 may also communicate with output devices or peripherals, such as displays, printers, speakers, headsets, banner displays, etc.

The processor 1310 may be configured to execute instructions stored in volatile memory 1340, non-volatile memory 1350, or other forms of computer readable storage media accessible to the processor 1310. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1350 may store program code and data, which also may be loaded into the volatile memory 1340 at execution time. Specifically, the non-volatile memory 1350 may store one or more CAM processing program modules 1353 which may correspond to the process flows previously disclosed, and/or operating system code 1352 containing instructions for performing the process and/or functions associated with the technologies disclosed herein. The message processing program modules 1353 may also access, generate, or store account data 1355, such as the aforementioned account information and data, in the non-volatile memory 1350, as well as in the volatile memory 1340. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 1310. These may form a part of, or may interact with, the CAM processing program modules 1353.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Users of GPR cards can easily check account related information, such as current balances, without having to use an ATM machine. This can occur by scanning a QR code on the GPR card using a mobile device, such as a smart phone. The QR code is generated and printed on the card to reflect information associated with the card, such as the account number. The QR code is further encoded with a destination address, which can be a URL, telephone number, or email address. The destination address can be used by the contact center to identify a card provider, e.g., the brand of the card, as well as a type of card within the brand.

Information, such as the current balance, can be obtained by conveying the account information in the communication request initiated by scanning a QR code, and used to retrieve the current balance. The current balance can be provided to the user in a format compatible with the communication, or in a different format. For example, a text message requesting account balance can result in a response text message, or can result in a response email message.

A separate QR code can be provided for the user to report a lost or stolen card, which allows fast and accurate notification, and receipt of confirmation of the notification. Further, by using a mobile application developed for reading the QR code, various other functions may be easily provided for allowing the user to perform common CAM functions.

Many modifications and other embodiments of the concepts and technologies set forth herein will come to mind to one skilled in the art having the benefit of the teachings presented in the foregoing descriptions and the associated drawings. For example, although the illustrations provided herein illustrate the concepts and technologies for a GPR card, the concepts and technologies identified herein could apply to GPR cards used for many other purposes, and for many other types of cards, including for providing financial services to a user in a flexible or controlled manner, such as corporate or personal credit cards, debit cards, flexible spending account cards, healthcare or insurance cards, or other form of cards for providing financial compensation or reimbursement for various services or benefits. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A contact center system for processing communication requests associated with a general purpose reloadable ("GPR") card comprising:
   a memory storing a plurality of data structures for linking a destination address and a GPR card provider; and
   a processor configured to:
      receive an activation communication from the user requesting activation of the GPR card,
      determine whether the GPR card has not been previously activated,
      after determining the GPR card has not been previously activated, record an originating address, wherein the originating address comprises a telephone number, and wherein the telephone number is associated with the activation communication,
      receive a GPR card-related communication directed to the destination address initiated in response to a mobile device reading a quick response ("QR") code on the GPR card thereby transmitting a request comprising a SMS text message for an account balance of a GPR card account, the GPR card-related communication including an account number, wherein the account number is associated with the GPR card and encoded by the QR code, the GPR card-related communication further including the originating address comprising the telephone number associated with the mobile device,
      retrieve information from the GPR card account comprising a user originating address,
      compare the user originating address with the originating address conveyed by the GPR card-related communication,
      determine the originating address is equal to the user originating address,
      generate a response communication including the account balance of the GPR card account, and
      provide the response communication to the mobile device.

2. The contact center system of claim 1, wherein the response communication comprises a second SMS text message provided to the user.

3. The contact center system of claim 2, wherein the response communication is directed to the user originating address.

4. The contact center system of claim 1, wherein the processor is configured to provide the response communication to the user as a voice call directed to the originating address.

5. A method for integrating use of a two-dimensional barcode ("2D barcode") on a general purpose reloadable ("GPR") card comprising:
   providing a user with the GPR card, the GPR card comprising indicia indicating an GPR card account and a 2D barcode, the 2D barcode indicating an account number associated with both the user and the GPR card account and a destination address, the destination address configured to receive requests for particular account information for the GPR card account, wherein the 2D barcode encodes an action to initiate a communication comprising a SMS text message by a mobile device to the destination address after the user scans the 2D barcode using the mobile device;
   receiving the communication comprising the SMS text message from the mobile device at a computer, wherein the communication comprises a request for an account balance associated with the GPR card account and includes the account number and wherein the communication is associated with an originating address comprising a telephone number of the mobile device;
   retrieving, by the computer, the account balance associated with the GPR card account; and
   providing, by the computer, a response communication directed to the originating address, the response communication conveying the account balance to the mobile device.

6. The method of claim 5, further comprising:
   retrieving GPR card account information associated with the GPR card account;
   ascertaining a communication address stored in the GPR card account information, wherein the communication address is associated with the user of the GPR card; and
   verifying that the communication address associated with the user is equal to the originating address in the communication received from the mobile device.

7. The method of claim 5, wherein the 2D barcode is a quick response ("QR") code.

8. The method of claim 7, wherein the computer is configured to receive multiple communications each associated with one of a plurality of GPR card brands, and wherein further the destination address is one of a plurality of destinations used in part by the computer to identify the one of the plurality of GPR card brands.

9. The method of claim 7, wherein the GPR card account is associated with a GPR card brand and further comprising:
   transmitting a schedule of fees associated with the GPR card brand to the mobile device.

10. The method of claim 7, wherein the response communication further comprises a recent transaction associated with the GPR card account.

11. A non-transitory, tangible computer-readable storage medium comprising instructions that when executed by a processor cause the processor to:
   receive an activation communication from the user requesting activation of the GPR card;
   determine whether the GPR card has not been previously activated;
   after determining the GPR card has not been previously activated, record an originating address, wherein the originating address comprises a telephone number, and wherein the telephone number is associated with the activation communication;
   receive a general purpose reloadable card management related ("GPRCMR") communication from a user, the GPRCMR communication having a first form comprising a first SMS text message and initiated after a two-dimensional barcode on a general purpose reloadable ("GPR") card is scanned using a mobile device, the GPRCMR communication conveying an account number identifying a GPR card account and the originating address comprising the telephone number;
   use the account number to retrieve GPR card account data;
   determine a user originating address indicated in the GPR card account data;
   determine the originating address in the GPRCMR communication is equal to the user originating address associated with the GPR card account data;
   determine the GPRCMR communication includes a request for an account balance of the GPR card account;
   retrieve the account balance of the GPR card account;
   generate a response communication to the user comprising the account balance; and
   transmit the response communication to the mobile device.

12. The non-transitory, tangible computer-readable storage medium of claim 11, wherein
the computer-readable storage medium further comprises instructions that when executed cause the processor to generate the response communication to the user using the user originating address in a second form, wherein the second form is a voice call.

13. The non-transitory, tangible computer-readable storage medium of claim 11, further comprising instructions that when executed cause the processor to:
determine one of a plurality of GPR card brands based on a destination address in the GPRCMR communication, wherein the destination address is encoded by the two-dimensional barcode on the GPR card.

14. The non-transitory, tangible computer-readable storage medium of claim 11, wherein the response communication further comprises a most recent transaction amount.

\* \* \* \* \*